(12) United States Patent
Hill (10) Patent No.: US 8,943,411 B1
(45) Date of Patent: Jan. 27, 2015

(54) SYSTEM, METHOD, AND COMPUTER PROGRAM FOR DISPLAYING CONTROLS TO A USER

(75) Inventor: Matthew Davis Hill, San Francisco, CA (US)

(73) Assignee: Amdocs Software Systems Limited, Dublin (IE)

( * ) Notice: Subject to any disclaimer, the term of this patent is extended or adjusted under 35 U.S.C. 154(b) by 60 days.

(21) Appl. No.: 13/413,610

(22) Filed: Mar. 6, 2012

(51) Int. Cl.
G06F 3/16 (2006.01)

(52) U.S. Cl.
USPC ........................................................ 715/728

(58) Field of Classification Search
CPC ....... G06F 3/0416; G06F 17/24; G06T 15/20; G06T 19/00
See application file for complete search history.

(56) References Cited

U.S. PATENT DOCUMENTS

| | | | | |
|---|---|---|---|---|
| 2004/0204851 A1* | 10/2004 | Fukuyasu | | 701/213 |
| 2007/0157095 A1* | 7/2007 | Bilow et al. | | 715/744 |
| 2007/0220444 A1* | 9/2007 | Sunday et al. | | 715/788 |
| 2009/0005078 A1* | 1/2009 | Dariel | | 455/456.2 |
| 2010/0048271 A1* | 2/2010 | Champagne et al. | | 463/6 |
| 2011/0167058 A1* | 7/2011 | van Os | | 707/722 |
| 2012/0062729 A1* | 3/2012 | Hart et al. | | 348/135 |
| 2013/0007643 A1* | 1/2013 | Edwards et al. | | 715/763 |
| 2013/0222246 A1* | 8/2013 | Booms et al. | | 345/168 |

OTHER PUBLICATIONS

"Keynote Keyboard Shortcuts," Apple—Support—Keynote—Keyboard Shortcuts, Mar. 28, 2011, retrieved from http://web.archive.org/web/20110328212258/http://www.apple.com/support/keynote/shortcuts/.
"ScreenMouseRotate—Screen and mouse rotation / invert screen and mouse," Teaching, Technology, and Learning, kenrick's blog, Dec. 24, 2010, retrieved from http://www.math.uaa.alaska.edu/~afkjmi/techteach/?q=node/70.

* cited by examiner

Primary Examiner — William Bashore
Assistant Examiner — Rayeez Chowdhury
(74) Attorney, Agent, or Firm — Zilka-Kotab, PC (57) ABSTRACT

A system, method, and computer program product are provided for displaying controls to a user. In use, input is received from a user. Additionally, a location of the user is determined with respect to a display, utilizing the input. Further, one or more controls are positioned on the display, based on the location of the user.

24 Claims, 6 Drawing Sheets

SYSTEM, METHOD, AND COMPUTER PROGRAM FOR DISPLAYING CONTROLS TO A USER

FIELD OF THE INVENTION

The present invention relates to content presentation, and more particularly to controlling content presentation.

BACKGROUND

A display device has become a common means of conveying information to one or more individuals. For example, visual and audio content may be presented to one or more users utilizing a display. Unfortunately, conventional methods for controlling content presentation have exhibited various limitations.

For example, a positioning of interactive means for controlling a display of content to one or more individuals (e.g., interface means, etc.) may not be adjustable according to a user's requirements. There is thus a need for addressing these and/or other issues associated with the prior art.

SUMMARY

A system, method, and computer program product are provided for displaying controls to a user. In use, input is received from a user. Additionally, a location of the user is determined with respect to a display, utilizing the input. Further, one or more controls are positioned on the display, based on the location of the user.

DETAILED DESCRIPTION

Figure 1:
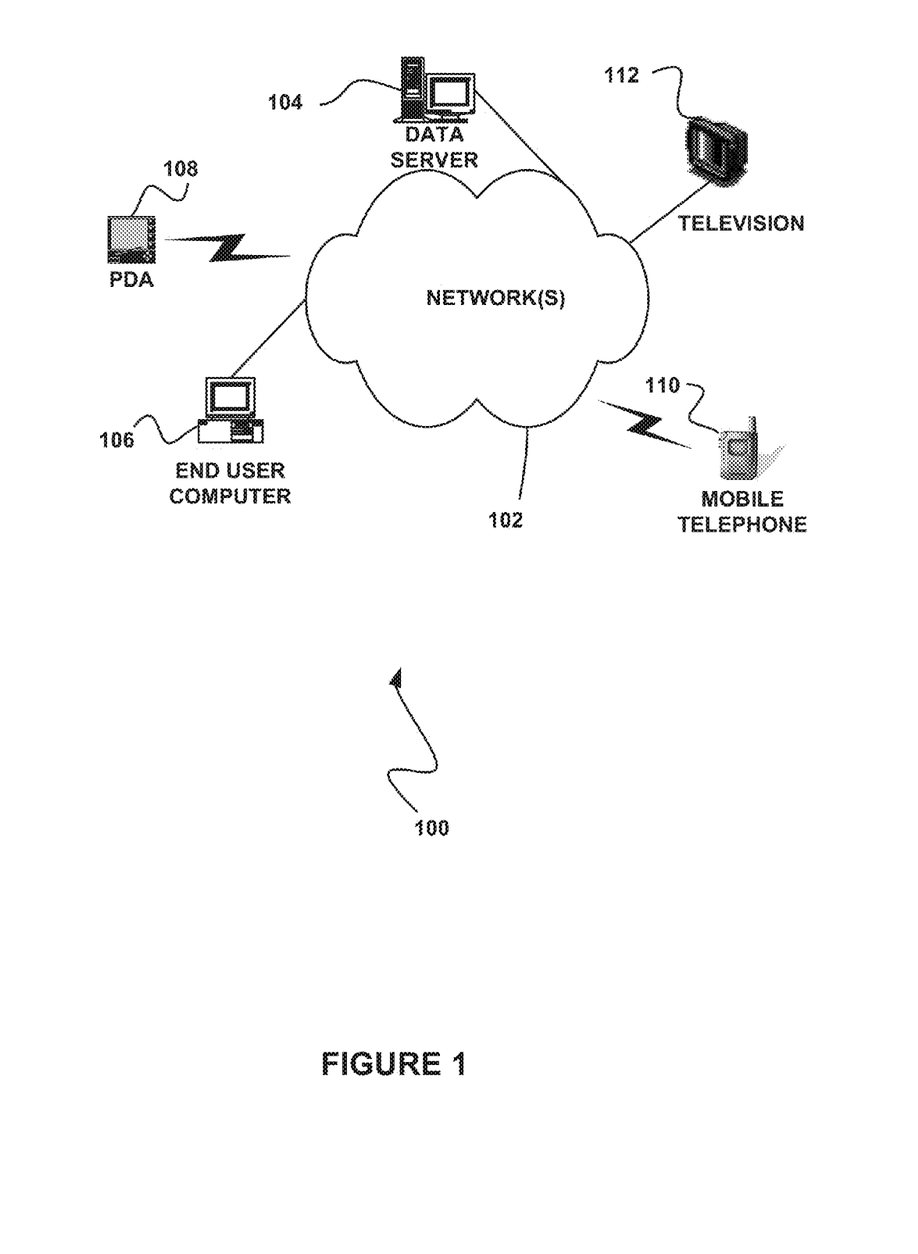
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
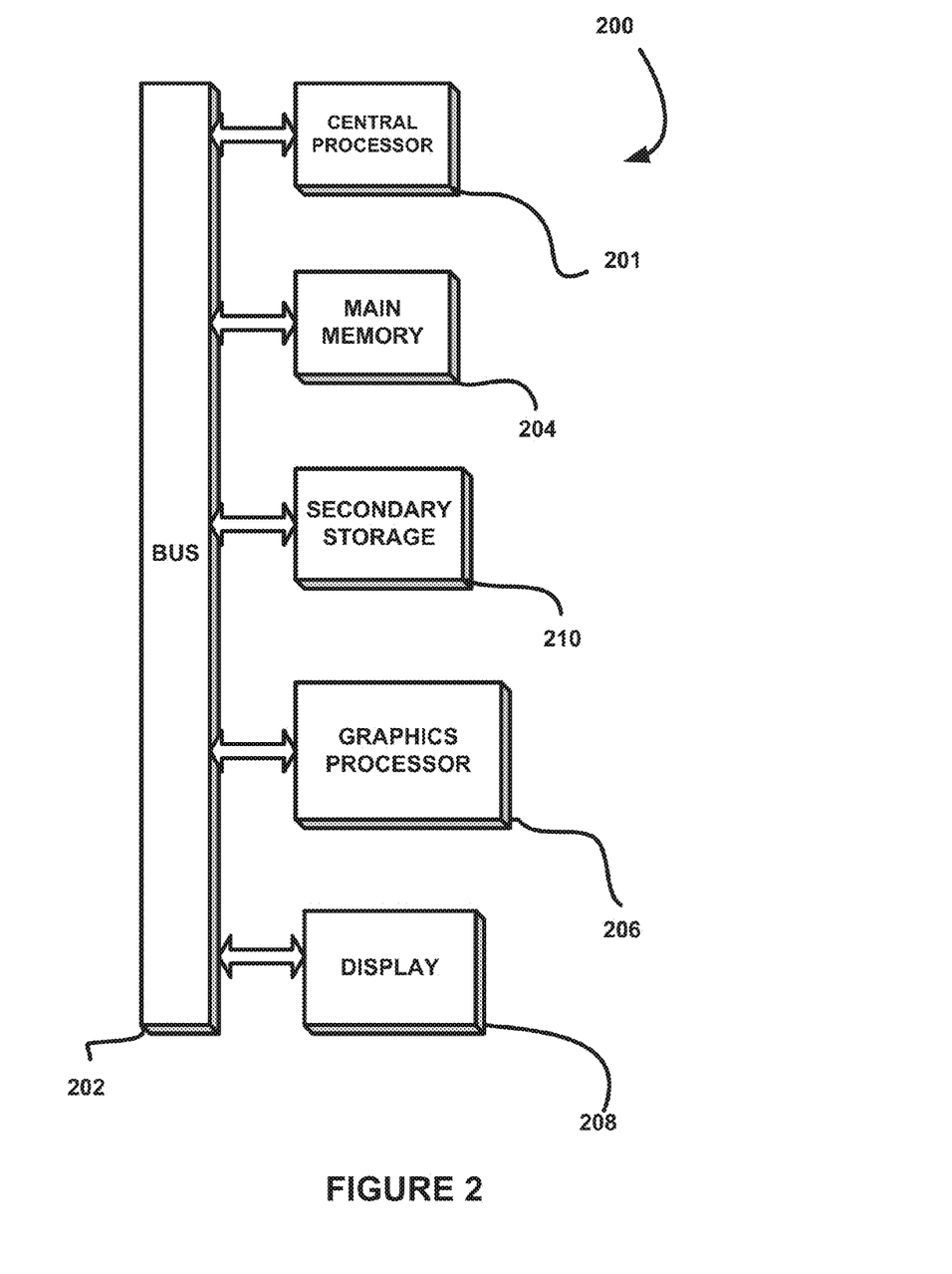
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
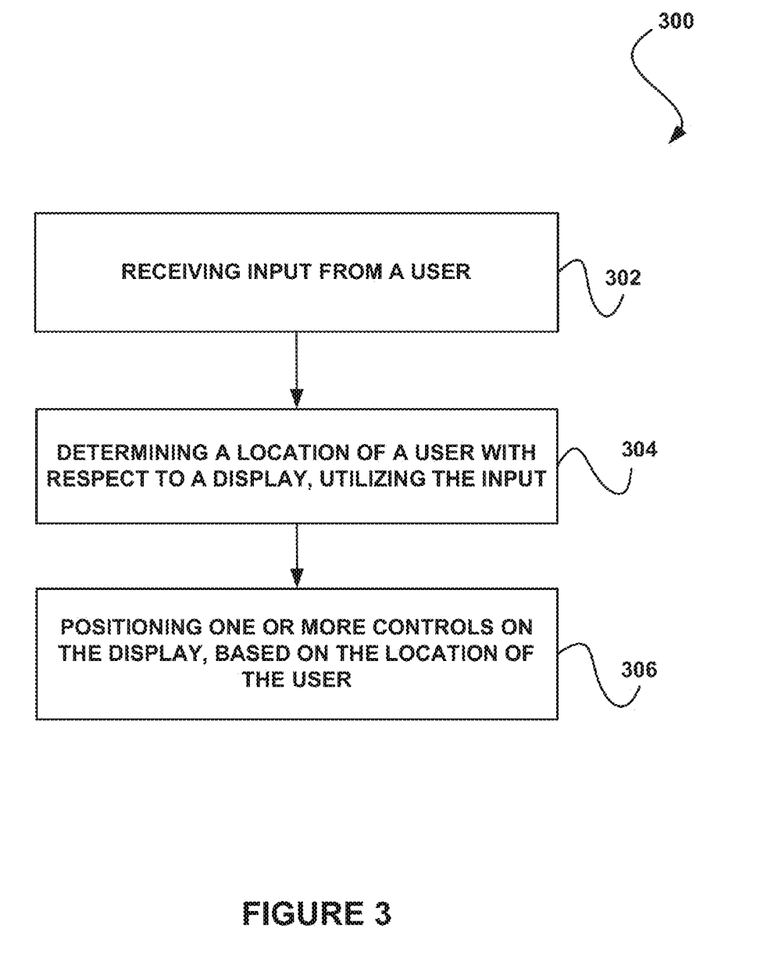
FIG. 3 illustrates a method for displaying controls to a user, in accordance with one embodiment.

FIG. 3 illustrates a method 300 for displaying controls to a user, in accordance with one embodiment. As an option, the method 304) may be carried out in the context of the details of FIGS. 1 and/or 2. Of course, however, the method 300 may be carried out in any desired environment. Further, the aforementioned definitions may equally apply to the description below.

As shown in operation 302, input is received from a user. In one embodiment, the input may be received at a computing device (e.g., a tablet computer, a laptop computer, a cellular telephone, a personal digital assistant (PDA), etc.). In another embodiment, the input may be transmitted by the user using a display of the computing device. For example, the input may be transmitted by the user touching a touch sensitive display of the computing device, where such touch sensitive display receives and converts the received tactile input into one or more commands. In another example, the user may tap the touch sensitive display with one or more fingers, the user may hold one or more fingers down on the display for a predetermined amount of time, the user may slide one or more fingers across the display, etc.

Additionally, in one embodiment, the input may be received from the user utilizing an interface. For example, an interface may be provided (e.g., displayed) to the user, and the input may include the user's interaction with such interface. For example, the input may include the user selecting one or more options of the interface, the user entering data into one or more fields of the interface, the user manipulating one or more elements of the interface, etc. In another embodiment, the input may include a gesture or movement made by the user. For example, a motion sensor of the computing device may detect the user's movement or gesture and may convert the detected movement or gesture into one or more commands.

Further, in one embodiment, the input may include voice input from the user. For example, the input may include one or more voice commands that are spoken by the user, received by a microphone of the computing device, and converted into one or more commands by the computing device. In another embodiment, the input may include a movement based input received from the user. For example, the input may include a tilting of a computing device by the user, a horizontal or vertical movement of the computing device by the user, etc.

Further still, in one embodiment, the input may be received using a camera of the computing device. For example, the camera of the computing device may identify a location of the user with respect to the computing device. In another embodiment, the input may include communication between the computing device and another device belonging to the user. For example, the input may include a near field communication (NFC) between the user's NFC-enabled device and an NFC-enabled computing device.

Additionally, as shown in operation 304, a location of the user is determined with respect to a display, utilizing the input. In one embodiment, the location of the user may include a physical positioning of the user with respect to a current physical position of the display. In another embodiment, the display may be included within a computing device. In yet another embodiment, the location of the user may include a direction from which the user is viewing the display.

Further, in one embodiment, the input may indicate the location of the user with respect to the display. In yet another embodiment, the computing device may calculate the location of the user with respect to the display based on the input. For example, the location of the user may be determined based on one or more of a gesture received by the user, text received by the user, a command received by the user, etc.

Further still, in one embodiment, the location of the user may be approximated. For example, the location of the user may be determined with respect to the closest side of the display at which the user is determined to be located. In another example, the location of the user may be determined with respect to the closest corner of the display at which the user is determined to be located.

Also, as shown in operation 306, one or more controls are positioned on the display, based on the location of the user. In one embodiment, positioning the one or more controls on the display may include displaying the one or more controls on the display. For example, the one or more controls may be displayed to the user after receiving the input from the user. In another embodiment, positioning the one or more controls on the display may include repositioning one or more controls that are already displayed on the display.

In addition, in one embodiment, the one or more controls may include means for the user to control one or more aspects of the display. For example, the one or more controls may include means for the user to change content displayed via the display, alter content displayed via the display, control one or more elements displayed utilizing the display, etc. In another example, the one or more controls may include slideshow controls, game play controls, message sending controls, document editing controls, etc. In another embodiment, the one or more controls may be associated with one or more applications of the computing device e.g., a messaging application, a slideshow application, a game application, etc.).

Further, in one embodiment, the one or more controls may include one or more interactive elements. For example, the one or more controls may include one or more selectable buttons (e.g., one or more buttons that may be selected by the user using a touch screen device, etc.). In another embodiment, the one or more controls may be positioned on the display such that the controls are located at a location within the display that is nearest the user. For example, if the user is determined to be located at a particular side of the display (e.g., facing the particular side or corner of the display), the controls may be positioned at that particular side or corner of the display.

Further still, in one embodiment, text and images associated with the one or more controls may be positioned on the display such that the text and images face the user in a readable manner. For example, if the user is determined to be located at the particular side of the display, text and images associated with the controls (e.g., text and images describing the controls, etc.) may be positioned such that they are aligned with that particular side of the display and readable from that particular side of the display.

Also, in one embodiment, the one or more controls may be located within a predetermined boundary within the display. For example, the one or more controls may be located within a box shown on the display, within a table shown on the display, etc. In another embodiment, a plurality of inputs may be received from a plurality of users, a plurality of locations may be determined with respect to the display, and a plurality of controls may be positioned on the display, based on the location of each user. In this way, each user may be provided one or more controls by the display.

Additionally, in one embodiment, the one or more controls may be positioned on the display in a rotational orientation different from additional content displayed on the display. For example, the additional content (e.g., slideshow content, video content, picture content, etc.) may be positioned such that the additional content faces a first direction, and the one or more controls may be positioned such that the one or more controls face a second direction, where such second direction differs from the first direction by 45 degrees, by 90 degrees, by 180 degrees, etc. In this way, the one or more controls may be positioned in front of the user at a first location with respect to the display, whereas the additional content may be positioned in front of another user at a second location different from the first location with respect to the display.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
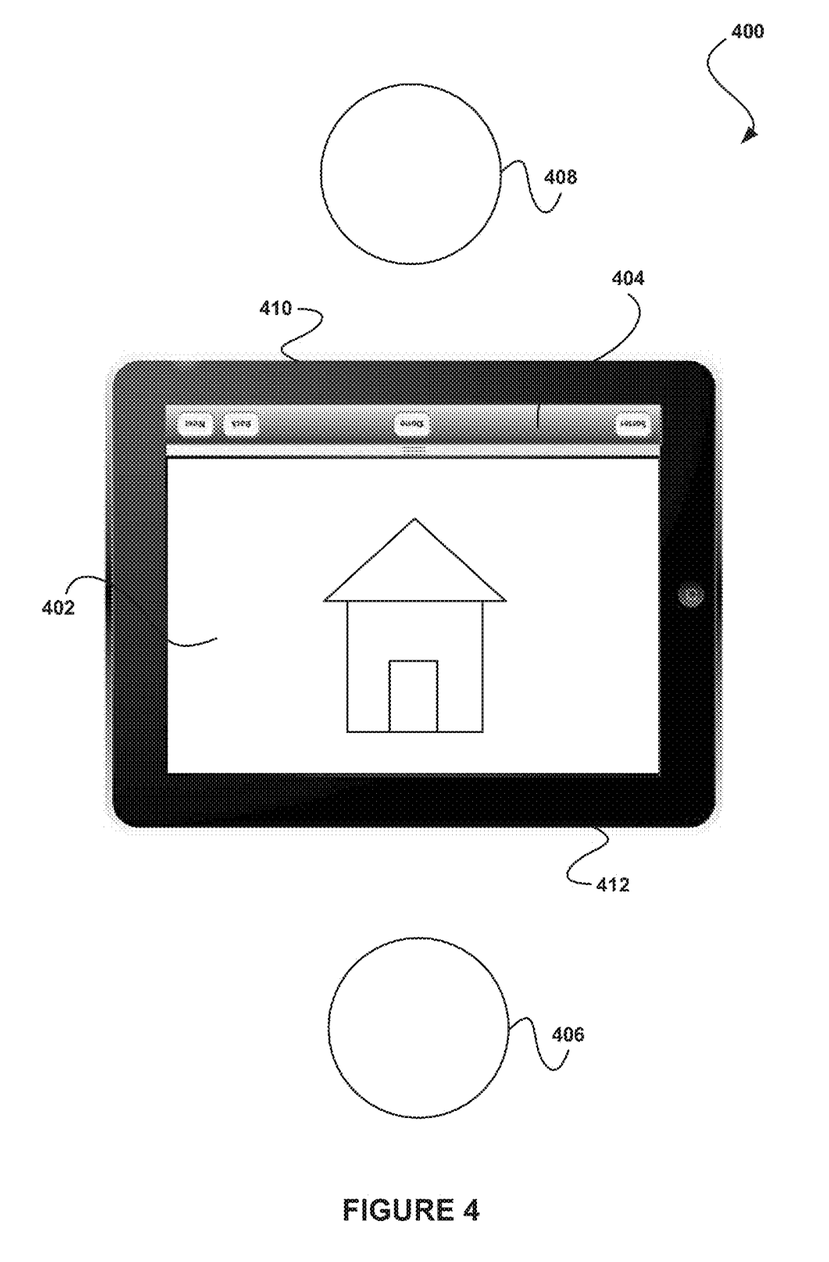
FIG. 4 illustrates an exemplary configurable display device, in accordance with one embodiment.

FIG. 4 illustrates an exemplary configurable display device 400, in accordance with one embodiment. As an option, the display device 400 may be carried out in the context of the details of FIGS. 1-3. Of course, however, the display device 400 may be carried out in any desired environment. Further, the aforementioned definitions may equally apply to the description below.

As shown, the display device 400 includes displayed content 402 facing a first user 406 positioned on one side 412 of the display device 400. Additionally, the display device 400 includes a displayed control panel 404 facing a second user 408 on another side of the display device 400 opposite the first user 406. In one embodiment, the control panel 404 may be used by the second user 408 to alter one or more elements of the displayed content 402 that is presented to the first user 406.

Additionally, in one embodiment, the displayed content 402 may face the first user 406 as a result of one or more actions that are performed with respect to the display device 400. For example, the display device 400 may be physically tilted toward the first user 406 by the first user 406 or the second user 408, and an accelerometer located within the display device 400 may detect such tilting and may adjust the displayed content 402 such that it faces the first user 406.

Further, in one embodiment, the displayed control panel 404 may face the second user 408 at the side 410 of the display device 400 closest to the second user 408 as a result of one or more actions that are performed with respect to the display device 400. For example, the second user 408 may touch the screen of the display device 400 at the side 410 of the display device 400 closest to the second user 408, where the touching is done in a certain manner (e.g., by making a gesture on the screen, by holding a finger down on the screen, by tapping a finger on the screen, etc.). Additionally, a touch sensitive element located within the screen of the display device 400 may detect such touching and may display the control panel 404 such that it faces the second user 408 at the side 410 of the display device 400 closest to the second user 408.

In this way, the display of the control panel 404 may be controlled separately from the display of the content 402, and the second user 408 may therefore conveniently use the displayed control panel 404 to control the displayed content 402 that is shown to the first user 406. For example, the displayed content 402 may include a digital slide show presentation, and the second user 408 may advance slides within the slide show, show previous slides within the slide show, and otherwise control the display of slides to the first user 406. Further still, the first user 406 may be actively engaged with the content, while the second user 408 may remain in con/no of the content.

Figure 5:
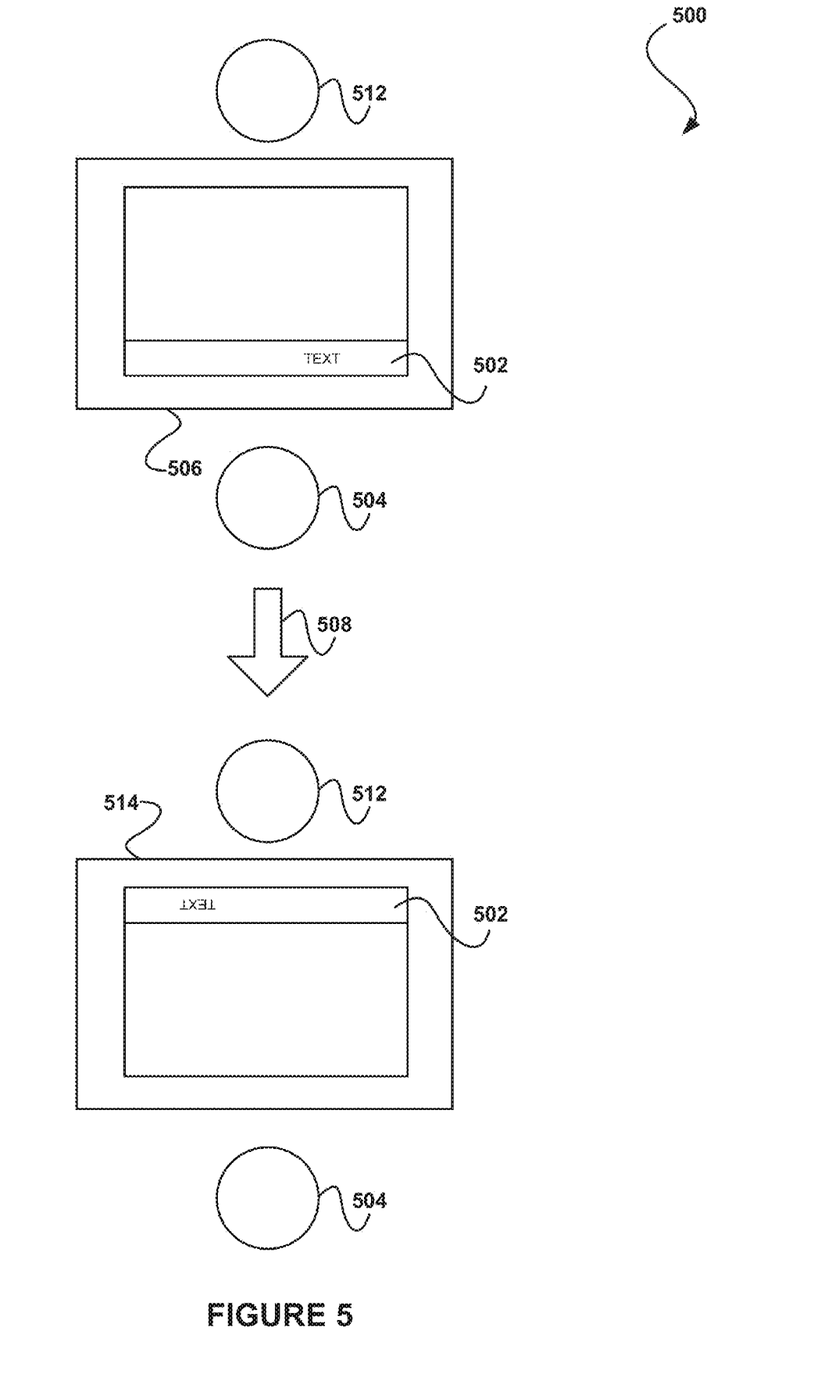
FIG. 5 illustrates another exemplary configurable display device, in accordance with one embodiment.

FIG. 5 illustrates another exemplary configurable display device 500, in accordance with one embodiment. As an option, the display device 500 may be carried out in the context of the details of FIGS. 1-4. Of course, however, the display device 500 may be carried out in any desired environment. Further, the aforementioned definitions may equally apply to the description below.

As shown, the display device 500 includes a displayed control panel 502 facing a first user 504, where such control panel 502 is positioned on a first side 506 of the display device 500 nearest the first user 504. In one embodiment, text, symbols, and visual objects located within the displayed control panel 502 may face the first user 504 such that they are readable and easily viewable by the first user 504.

Additionally, the displayed control panel 502 is moved 508 to a second location, such that displayed control panel 502 faces a second user 512, where such control panel 502 is positioned on a second side 514 of the display device 500 nearest the second user 512. In one embodiment, text, symbols, and visual objects located within the displayed control panel 502 may now face the second user 512 such that they are readable and easily viewable by the first user 512.

Further, in one embodiment, the moving 508 of the control panel 502 may be performed by the first user 504 or the second user 512. For example, the first user 504 or the second user 512 may select the control panel 502 (e.g., by touching it, tapping on it, etc.) and drag the control panel 502 from the first side 506 of the display device 500 to the second side 514 of the display device 500. In another example, the first user 504 or the second user 512 may select the control panel 502 and may then select a destination for the control panel 502 (e.g., by selecting a portion of the screen of the display device 500 near the second side 514 of the display device 500, etc.).

In this way, the control panel 502 may be moved between the first user 504 and the second user 512 so that both the first user 504 and the second user 512 may control displayed elements of the display device 500.

Figure 6:
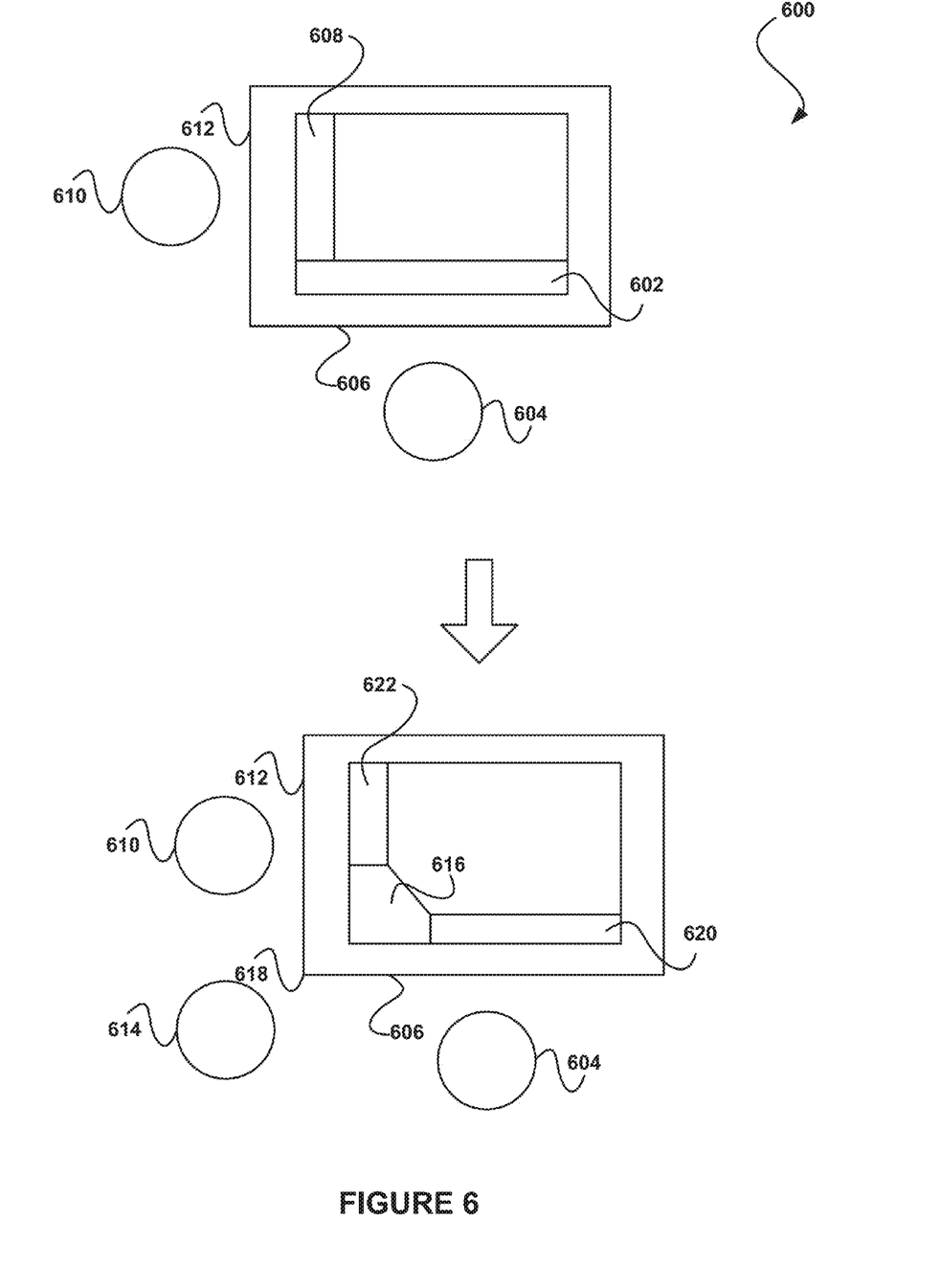
FIG. 6 illustrates yet another exemplary configurable display device, in accordance with one embodiment.

FIG. 6 illustrates yet another exemplary configurable display device 600, in accordance with one embodiment. As an option, the display device 600 may be carried out in the context of the details of FIGS. 1-5. Of course, however, the display device 600 may be carried out in any desired environment. Further, the aforementioned definitions may equally apply to the description below.

As shown, the display device 600 includes a first displayed control panel 602 facing a first user 604, where such control panel 602 is positioned on a first side 606 of the display device 600 nearest the first user 604. Additionally, the display device 600 includes a second displayed control panel 608 facing a second user 610, where such control panel 608 is positioned on a second side 612 of the display device 600 nearest the second user 610. In one embodiment, the first user 604 and the second user 610 may be participating in a meeting and may utilize their respective control panels 602 and 608 to control the information displayed by the display device 600.

Further, a third user 614 joins the first user 604 and the second user 610 at the display device 600, and initiates the display of a third displayed control panel 616 at the corner 618 of the display device closest to the third user 614. In one embodiment, the third user 614 may initiate the display of the third displayed control panel 616 by tapping the screen of the display device 600 near the corner 618 of the display device 600, by dragging a finger on the screen of the display device 600 towards the corner 618 of the display device, etc.

Further still, the first displayed control panel 602 facing a first user 604 and the second displayed control panel 608 facing a second user 610 are resized as an adjusted first displayed control panel 620 facing the first user 604 and an adjusted second displayed control panel 622 facing the second user 610, where such resizing is done to accommodate the third displayed control panel 616 at the corner 618 of the display device. In this way, the first user 604, the second user 610, and the third user 614 may participate in a meeting and may utilize their respective control panels 620, 622, and 616 to control the information displayed by the display device 600.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for receiving input from a first user and a second user;
    computer code for determining a current physical location of the first user and the second user with respect to a current physical location of a display, utilizing the input from the first user;
    computer code for positioning a first control panel adjacent to a first side of the display, based on the current physical location of the first user with respect to the current physical location of the display;
    computer code for positioning a second control panel adjacent to a second side of the display and adjacent to the first control panel, based on the current physical location of the second user with respect to the current physical location of the display;
    computer code for receiving input from a third user;
    computer code for determining that the third user is currently located between the first user and the second user with respect to the current physical location of the display, utilizing the input from the third user;
    computer code for resizing the first control panel adjacent to the first side of the display and the second control panel adjacent to the second side of the display to accommodate a third control panel on a corner on the display adjacent to the first side of the display and the second side of the display; and computer code for positioning the third control panel on the display adjacent to the corner on the display and also adjacent to both the first control panel and the second control panel, based on the current physical location of the third user with respect to the current physical location of the display.

2. The computer program of claim 1, wherein the input is transmitted by the first user using a display of a computing device.

3. The computer program of claim 1, wherein the input is transmitted by the user touching a touch sensitive display of a computing device, where such touch sensitive display receives and converts the input into one or more commands.

4. The computer program of claim 1, wherein the input is received using a camera of a computing device.

5. The computer program of claim 1, wherein the input includes communication between a computing device and another device belonging to the first user.

6. The computer program of claim 1, wherein an interface is provided to the first user, and the input includes the first user's interaction with such interface.

7. The computer program of claim 1, wherein the input includes a gesture or movement made by the first user.

8. The computer program of claim 1, wherein the input includes voice input from the first user.

9. The computer program of claim 1, wherein the current physical location of the first user with respect to the current physical location of the display includes a direction from which the first user is viewing the display.

10. The computer program of claim 1, wherein the input indicates the current physical location of the first user with respect to the current physical location of the display.

11. The computer program of claim 1, wherein the current physical location of the first user is determined with respect to a closest side of the display at which the first user is determined to be located.

12. The computer program of claim 1, wherein positioning the first control panel on the display includes displaying the one or more controls on the display.

13. The computer program of claim 1, wherein positioning the first control panel on the display includes repositioning one or more controls that are already displayed on the display.

14. The computer program of claim 1, wherein the first control panel include means for the user to control one or more aspects of the display.

15. The computer program of claim 1, wherein the first control panel include means for the user to change content displayed via the display.

16. The computer program of claim 1, wherein the first control panel includes one or more of slideshow controls, game play controls, message sending controls, and document editing controls.

17. The computer program of claim 1, wherein text and images associated with the first control panel are positioned on the display such that the text and images face the first user in a readable manner.

18. The computer program of claim 1, wherein the first control panel is positioned on the display in a rotational orientation different from additional content displayed on the display.

19. A method, comprising:
receiving input from a first user and a second user;
determining a current physical location of the first user and the second user with respect to a current physical location of a display, utilizing the input from the first user;
positioning a first control panel adjacent to a first side of the display, based on the current physical location of the first user with respect to the current physical location of the display;
positioning a second control panel adjacent to a second side of the display and adjacent to the first control panel, based on the current physical location of the second user with respect to the current physical location of the display;
receiving input from a third user;
determining that the third user is currently located between the first user and the second user with respect to the current physical location of the display, utilizing the input from the third user;
resizing the first control panel adjacent to the first side of the display and the second control panel adjacent to the second side of the display to accommodate a third control panel on a corner on the display adjacent to the first side of the display and the second side of the display; and
positioning the third control panel on the display adjacent to the corner on the display and also adjacent to both the first control panel and the second control panel, based on the current physical location of the third user with respect to the current physical location of the display.

20. A system, comprising:
a processor for:
receiving input from a first user and a second user;
determining a current physical location of the first user and the second user with respect to a current physical location of a display, utilizing the input from the first user;
positioning a first control panel adjacent to a first side of the display, based on the current physical location of the first user with respect to the current physical location of the display;
positioning a second control panel adjacent to a second side of the display and adjacent to the first control panel, based on the current physical location of the second user with respect to the current physical location of the display;
receiving input from a third user;
determining that the third user is currently located between the first user and the second user with respect to the current physical location of the display, utilizing the input from the third user;
resizing the first control panel adjacent to the first side of the display and the second control panel adjacent to the second side of the display to accommodate a third control panel on a corner on the display adjacent to the first side of the display and the second side of the display; and
positioning the third control panel on the display adjacent to the corner on the display and also adjacent to both the first control panel and the second control panel, based on the current physical location of the third user with respect to the current physical location of the display.

21. The system of claim 20, wherein the processor is coupled to memory via a bus.

22. The computer program of claim 18, wherein the one or more controls are positioned at a first orientation on the display for use of the one or more controls by the first user, and the additional content is positioned at a second orientation on the display for viewing by the second user at a second physical location different from the current physical location of the first user.

23. The computer program of claim 22, wherein a display of the one or more controls is controlled separately from a display of the additional content, such that the first user interacts with the one or more controls while the second user views the additional content.

24. The computer program of claim 1, wherein both the first control panel and the second control panel are utilized to control information displayed on the display.

\* \* \* \* \*